United States Patent
Xia (10) Patent No.: US 11,249,328 B1
(45) Date of Patent: Feb. 15, 2022

(54) ONE-WAY GLASS BASED ON PERSISTENCE OF VISION OF HUMAN EYES

(71) Applicant: HANGZHOU QISU TECHNOLOGY CO., LTD., Hangzhou (CN)

(72) Inventor: Nan Xia, Hangzhou (CN)

(73) Assignee: HANGZHOU QISU TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/416,521

(22) PCT Filed: Dec. 16, 2019

(86) PCT No.: PCT/CN2019/125529
§ 371 (c)(1),
(2) Date: Jun. 21, 2021

(87) PCT Pub. No.: WO2020/125568
PCT Pub. Date: Jun. 25, 2020

(30) Foreign Application Priority Data

Dec. 21, 2018 (CN) .......................... 201811570922.0

(51) Int. Cl.
*G02F 1/01* (2006.01)
*E06B 9/24* (2006.01)
*E06B 3/67* (2006.01)

(52) U.S. Cl.
CPC .......... *G02F 1/0105* (2013.01); *E06B 3/6722* (2013.01); *E06B 9/24* (2013.01); *G02F 1/0121* (2013.01); *E06B 2009/2464* (2013.01)

(58) Field of Classification Search
CPC ........ G02F 1/00; G02F 1/0105; G02F 1/0121; E06B 3/6722; E06B 9/24; E06B 2009/2464
See application file for complete search history.

(56) References Cited

FOREIGN PATENT DOCUMENTS

| CN | 203562154 U | 4/2014 | |
|---|---|---|---|
| CN | 105607294 A | 5/2016 | |
| CN | 108139615 A | 6/2018 | |
| CN | 109458107 A | 3/2019 | |
| CN | 209494451 U | 10/2019 | |
| CN | 209510082 U | 10/2019 | |
| WO | 2017065693 A1 | 4/2017 | |
| WO | WO2017065693 | * 4/2017 | ............... G02F 1/00 |

* cited by examiner

*Primary Examiner* — Joseph P Martinez
(74) *Attorney, Agent, or Firm* — Bayramoglu Law Offices LLC (57) ABSTRACT

A one-way glass based on the persistence of vision of human eyes includes a double glazing or a single glazing. The double glazing includes a switchable glass with electrically controllable and adjustable light transmittance, and a luminous glass that is electronically controlled to emit light. The luminous glass is a transparent glass. The switchable glass and the luminous glass are controlled by pulse signals of a pulse controller. When the luminous glass emits light, the switchable glass does not transmit light. When the switchable glass transmits light, the luminous glass does not emit light. Dot-matrix LED light sources are uniformly provided on the single glazing. A side of the dot-matrix LED light source facing indoors is provided with a light-shielding layer. A transparent gap is formed between adjacent dot-matrix LED light sources.

20 Claims, 12 Drawing Sheets

ONE-WAY GLASS BASED ON PERSISTENCE OF VISION OF HUMAN EYES

CROSS REFERENCE TO THE RELATED APPLICATIONS

This application is the national phase entry of International Application No. PCT/CN2019/125529, filed on Dec. 16, 2019, which is based upon and claims priority to Chinese Patent Application No. 201811570922.0, filed on Dec. 21, 2018, the entire contents of which are incorporated herein by reference.

TECHNICAL FIELD

The present invention belongs to the field of glass, and in particular, relates to a one-way glass based on the persistence of vision of human eyes.

BACKGROUND

With the improvement of the quality of life, people's requirements for privacy becomes greater. In the indoor space where people live, light is transmitted through windows. The windows, however, also expose the indoor space in full view of the outdoor space while allowing the light to transmit therethrough. Traditionally, people use curtains to block the light, open the curtains when requiring light transmission, and close the curtains when requiring more privacy. Advancements in science and technology enable people to directly control the glass and adjust its transparency or light transmittance.

As for glass with adjustable transparency, for example, Chinese Patent No. CN102385187A, titled Composite Electro-induced Liquid Crystal Atomized Glass and Manufacturing Method Thereof published on Dec. 11, 2013, discloses an electronically controlled atomized glass, the transparency of which can be adjusted through on-off control of power to switch between a clear state and an atomized state.

As for glass with adjustable light transmittance, for example, mobile phone screens and LCD screens as computer monitors that are frequently used in daily life, and electronic ink that is switchable between black and white colors, can be electronically controlled to adjust their light transmittance to switch between a light-transmitting state and a non-light-transmitting state.

However, the adjustment of the above-mentioned two kinds of adjustable glass is two-way, that is, both sides are visible when in a clear state but are invisible when in a blocked state.

In the prior art, there is also a way of using indoor light sources to achieve one-way visibility. For example, in International Patent No. WO2017/065693, published on Apr. 20, 2017, an LED light source is provided indoors, and a switchable window is a glass with switchable light transmittance. The LED light source and the switchable window can be powered on and off synchronously by using pulse signals. When the LED light source is on, the window is in a non-light-transmitting state. When the LED light source is off, the window is in a light-transmitting state, in which the outdoor view is visible from the indoors, while the indoor view is invisible from the outdoors because the indoors are dark, thereby achieving one-way visibility. In this solution, a good one-way visibility effect is achieved only when both the indoors and the outdoors are dark. If there are other light sources indoors, then the indoors are also visible to the outdoors when the switchable window is transparent. If it is daytime or there is a light source outdoors, the outdoor light irradiates into the indoors when the switchable window is transparent, so that the indoors has a certain brightness, making the indoors visible to the outdoors. Therefore, this solution has very limited application scenarios, as it achieves one-way visibility only when both sides of the switchable window are dark and illumination is performed only by the LED light source adjusted synchronously with the window.

SUMMARY

To solve the problems that the adjustment of prior electronically controlled adjustable glass is two-way, and prior one-way glass used in cooperation with indoor LED light sources has significant limitations, the present invention aims to provide a one-way glass based on the persistence of vision of human eyes.

To solve the above-mentioned technical problems, the present invention adopts the following technical solution. A one-way glass based on the persistence of vision of human eyes includes a double glazing. The double glazing includes a switchable glass with electrically controllable and adjustable light transmittance, and a luminous glass that is electronically controlled to emit light. The luminous glass is a transparent glass. The switchable glass and the luminous glass are controlled by pulse signals of a pulse controller. When the luminous glass emits light, the switchable glass does not transmit light. When the switchable glass transmits light, the luminous glass does not emit light. In an example where the switchable glass faces indoors and the luminous glass faces outdoors, due to the effect of persistence of vision, when the luminous glass emits light, the eyes of outdoor people receive the light from the luminous glass. When the luminous glass stops emitting the light for a period of time, due to the persistence of vision, the outdoor people still perceive that the luminous glass is emitting light, and are insensitive to light that is emitted or reflected from an indoor object and has lower brightness than the light from the luminous glass, so that the outdoor people cannot observe the indoor view. Therefore, when the electrical signal frequency of the pulse controller reaches a threshold of the persistence of vision of human eyes, a continuous luminous signal is formed in the eyes of the outdoor people, so that the outdoor people cannot see the indoor view. Moreover, when the luminous glass emits light, the switchable glass does not transmit light, and indoor people cannot see the light from the luminous glass; and conversely, when the switchable glass transmits light, the luminous glass does not emit light, and the outdoor view can be observed normally, thereby achieving one-way visibility from the indoors to the outdoors. In addition, even if an indoor light is turned on with a brightness higher than the brightness of the luminous glass, since other objects in the indoors are illuminated by diffuse reflectors and the reflected brightness does not exceed the brightness of the luminous glass, the outdoor people can only see the indoor light but cannot observe other objects in the indoors. The one-way glass can realize one-way visibility from the indoors to the outdoors regardless of day or night without being affected by indoor and outdoor illumination conditions. Even if a room is equipped with multiple windows to form multiple light sources for lighting, one-way visibility can still be achieved in the direction of setting the one-way glass. The one-way glass can also be used in the eyes of a wearable robot helmet, so that the eyes of the robot helmet have a luminous effect, and the inside of the robot helmet is invisible to the outside of the robot helmet, without affecting the wearer's line of sight. The non-light-transmitting duration of the switchable glass may be longer than the light-emitting duration of the luminous glass in each pulse period to ensure that the non-light-transmitting duration of the switchable glass completely covers the light-emitting duration of the luminous glass. In the present invention, the luminous glass and the switchable glass are functionally separated in a layered manner, serving as carriers of a luminous component and a dimming component. In practical use, the luminous glass and the switchable glass may be combined into one piece of glass or may be made separately into two pieces of glass, which shall belong to the equivalent replacement solutions of the present invention. The glass uses its light-transmitting effect. If the glass is replaced with other light-transmitting carriers to produce the same light-transmitting effect, such solutions shall be considered as equivalent replacements.

Preferably, the pulse controller is connected to a power source, and the pulse controller has two states of 0 and 1, wherein 1 indicates a power-on signal, and 0 indicates a power-off signal. In this case, the control signals of the pulse controller are either power-on signals or power-off signals. Each pulse period includes a period of a power-on state and a period of a power-off state. The luminous glass is controlled to switch between a light-emitting state and a non-light-emitting state. The switchable glass is controlled to switch between a light-transmitting state and a non-light-transmitting state. Preferably, the pulse controller synchronously controls electrical signals of the switchable glass and the luminous glass. The switchable glass does not transmit light when powered on, and transmits light when powered off. The luminous glass emits light when powered on, and does not emit light when powered off. In addition, preferably, the pulse controller asynchronously controls the electrical signals of the switchable glass and the luminous glass. The switchable glass transmits light when powered on, and does not transmit light when powered off. The luminous glass emits light when powered on, and does not emit light when powered off.

Preferably, the luminous glass is a self-luminous structure, and the luminous glass is an organic light-emitting diode (OLED) self-luminous transparent screen or a transparent glass with dot-matrix LED light sources. The gaps of the dot-matrix LED light sources can transmit natural light from the outside to make the glass transparent. The dot-matrix LED light source can be a mini-LED or micro-LED with micron-sized luminous particles, thereby reducing the influence of the light source on the light transmittance of the transparent glass.

In addition, preferably, the luminous glass is a passive projection luminous structure, and the luminous glass is an atomized glass with electrically controllable and adjustable transparency. The outer side of the atomized glass is provided with a projection device facing the atomized glass. The switchable glass, the atomized glass, and the projection device are controlled by the pulse signals of the pulse controller. When the atomized glass is atomized to be opaque, and the projection device is started to project onto the atomized glass, the switchable glass does not transmit light. When the switchable glass transmits light, the atomized glass is transparent, and the projection device is turned off to stop the projection. The transparency of the atomized glass can be electronically controlled and adjusted to switch between a clear state and an atomized state. During the process of adjusting the transparency of the atomized glass, the atomized glass is always in a light-transmitting state. Namely, in the clear state, the atomized glass transmits light and is transparent; and in the atomized state, the atomized glass transmits light but is opaque. Due to the effect of persistence of vision, the atomized glass, when atomized, is equivalent to a frosted glass and can be used as a screen of the projection device. The projection device projects onto the atomized glass, and the eyes of outdoor people receive high-brightness projected images. When the projection is stopped for a period of time, due to the persistence of vision, the outdoor people still have the persistence of the projected images, and are insensitive to light that is emitted or reflected from an indoor object and has lower brightness than the light from the luminous glass, so that the outdoor people cannot observe the indoor view. Therefore, when the electrical signal frequency of the pulse controller reaches the threshold of the persistence of vision of human eyes, a continuous projection signal is formed in the eyes of the outdoor people, so that the outdoor people cannot see the indoor view. Moreover, when the atomized glass is atomized and projected, the switchable glass does not transmit light, so that indoor people cannot see the projected images; and when the switchable glass transmits light and the atomized glass is transparent, the projection is stopped, so that the outdoor view can be observed normally from the indoors, thereby achieving one-way visibility from the indoors to the outdoors. In addition, even if an indoor light is turned on with a brightness higher than the brightness of the projection, since other objects in the indoors are illuminated by diffuse reflectors and the reflected brightness does not exceed the brightness of the projection, the outdoor people can only see the indoor light but cannot observe other objects in the indoors. The one-way glass can realize one-way visibility from the indoors to the outdoors regardless of day or night without being affected by indoor and outdoor illumination conditions. Even if a room is equipped with multiple windows to form multiple light sources for lighting, one-way visibility can still be achieved in the direction of setting the one-way glass. The one-way glass not only serves as a one-way visible privacy glass, but also can be used as an advertising projection screen facing the outdoors.

In addition, preferably, the luminous glass is a passive projection luminous structure. The luminous glass is a reflective glass with a surface provided with dot-matrix reflective sheets, and a transparent gap is formed between adjacent reflective sheets. The outer side of the reflective glass is provided with a projection device facing the reflective glass. The projection device and the luminous glass are controlled by the pulse signals of the pulse controller. When the projection device is turned on, the switchable glass does not transmit light. When the switchable glass transmits light, the projection device is turned off. The reflective glass with the dot-matrix reflective sheets reduces the amount of light transmitted in the light-transmitting state, but reduces the number of control modules of the reflective glass, thereby reducing the costs of control and energy consumption. Moreover, the cost of the reflective glass is lower.

Preferably, the dot-matrix reflective sheets account for 5-50% of the area of the surface of the luminous glass.

Preferably, the pulse signals of the pulse controller have a frequency of 24 Hz or more, and the duty cycle of the light-emitting duration of the luminous glass in each pulse signal period is not less than 0.1.

Preferably, a side of the switchable glass is provided with an indoor light source. The indoor light source is controlled by the pulse signals of the pulse controller. When the indoor light source emits light, the switchable glass does not transmit light. When the switchable glass transmits light, the indoor light source does not emit light. The indoor light source always emits light when the switchable glass does not transmit light. The indoor light source is invisible to the outdoors, so that in the projection-based solution mentioned above, the indoor light source will not cause interference to the projected image. The indoor light source can be controlled synchronously with the luminous glass to reduce the complexity of the pulse circuit.

To solve the above-mentioned technical problems, the present invention adopts another technical solution as follows. A one-way glass based on the persistence of vision of human eyes includes a single glazing. Dot-matrix luminous bodies are uniformly provided on the single glazing. A side of the dot-matrix luminous body facing indoors is provided with a light-shielding layer. A transparent gap is formed between adjacent dot-matrix light sources. The dot-matrix light sources irradiate and emit light in one direction, which is visible to the outdoor people. When relatively dark, the indoors are invisible to the outdoor people, but the indoor people can see outdoor objects without being affected by the dot-matrix light sources. The one-way glass does not need pulse adjustment, and thus has lower costs.

Preferably, the dot-matrix luminous bodies are self-luminous dot-matrix LED light sources. The light-shielding layer is a black light-shielding coating applied on a side of the dot-matrix LED light source facing indoors. The light-shielding coatings and the dot-matrix LED light sources are correspondingly distributed in a dot matrix.

In addition, preferably, the dot-matrix luminous bodies are dot-matrix reflective sheets attached to the inner surface of the single glazing for passive projection and light emission. The light-shielding layer is a black light-shielding coating applied on a side of the dot-matrix reflective sheet facing indoors. The light-shielding coatings and the dot-matrix reflective sheets are correspondingly distributed in a dot matrix. A side light source is provided on a side of the single glazing in a circumferential direction. The side light source irradiates the single glazing from the circumferential direction. Light from the side light source is totally reflected on the inner and outer surfaces of the single glazing. The light from the side light source is diffusely reflected at the dot-matrix reflective sheets. The side light source adjusts the direction of the light to form light incident from the circumferential side of the single glazing and totally reflected on the front and rear sides of the single glazing. When irradiating the reflective sheets, the totally reflected light is diffusely reflected to emit light irradiating outwards. In this way, the cost is reduced.

Preferably, a light pipe is provided between the side light source and a circumferential side wall of the single glazing. The inner wall of the light pipe is provided with a light-shielding coating. The light-shielding coating absorbs light with an excessively large incident angle from the side light source and only retains light totally reflected on the inner and outer sides of the one-way glass. In addition, preferably, a lens for converging the direction of light is provided between the side light source and the circumferential side wall of the single glazing.

In addition, preferably, the dot-matrix luminous bodies are dot-matrix reflective sheets for passive projection and light emission. The light-shielding layer is a polarizing film that entirely covers the single glazing on a side of the dot-matrix reflective sheets facing indoors. The outer side of the single glazing is provided with a polarized light projection device facing the single glazing. The polarized light projection device projects polarized light in a single polarization direction that can be absorbed by the polarizing film onto the single glazing. In this solution, the polarized light projection device projects the polarized light in a single polarization direction. The polarized light is diffusely reflected at the reflective sheets, and is completely absorbed when irradiated on the surface of the polarizing film at the gaps of the reflective sheets, so that the indoor people can see the light from the projection device. Moreover, for natural light, the polarization direction is balanced in all directions. After being half absorbed by the polarizing film, outdoor light is visible to the indoor people. After indoor light is half absorbed by the polarizing film, the brightness of the indoor light is much smaller than the brightness of the light diffusely reflected at the reflective sheets from the polarized light projection device. Due to the effect of persistence of vision, the projection at the reflective sheets is visible to the human eyes, and the sensitivity to the indoor light is shielded so that the indoor light is invisible. In this solution, the polarized light projection device can be always turned on without pulse control, and the projection brightness can be significantly improved.

Preferably, the dot-matrix luminous bodies account for 30-60% of the area of the surface of the single glazing.

In the present invention, based on the effect of persistence of vision, the one-way glass adopts a luminous structure that makes the outside visible and the inside invisible, so that the indoors are invisible to the outdoor people due to the effect of persistence of vision, thereby achieving one-way visibility from the indoors to the outdoors.

BRIEF DESCRIPTION OF THE DRAWINGS

The present invention will be further described below with reference to the drawings.

In the figures: 1. self-luminous glass, 2. switchable glass, 3. atomized glass, 4. projection device, 5. reflective glass, 6. dot-matrix reflective sheet, 7. single glazing, 8. dot-matrix LED light source, 9. light-shielding coating, 10, dot-matrix reflective sheet, 11. side light source, 12. light pipe, 13. polarizing film, 14. polarized light projection device.

DETAILED DESCRIPTION OF THE EMBODIMENTS

The present invention will be further described below through the specific embodiments in conjunction with the drawings.

Figure 1:
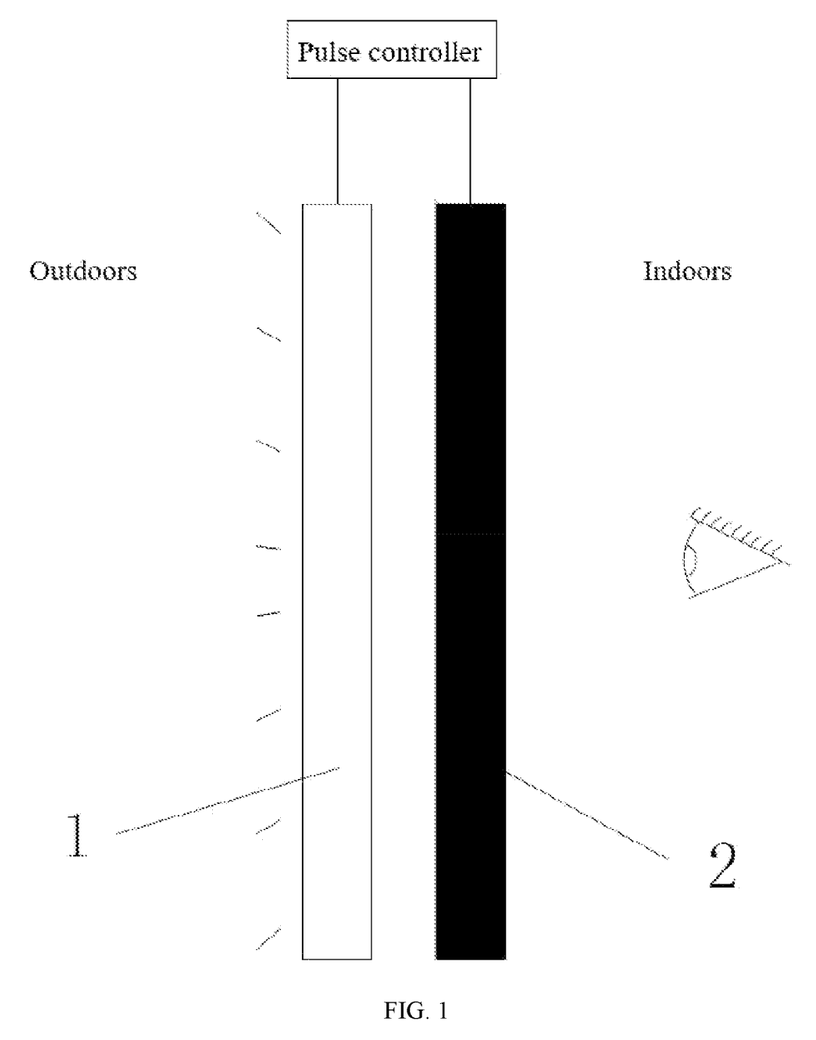
FIG. 1 is a schematic diagram of a switchable glass in a non-light-transmitting state according to Embodiment 1 of the present invention.
Figure 2:
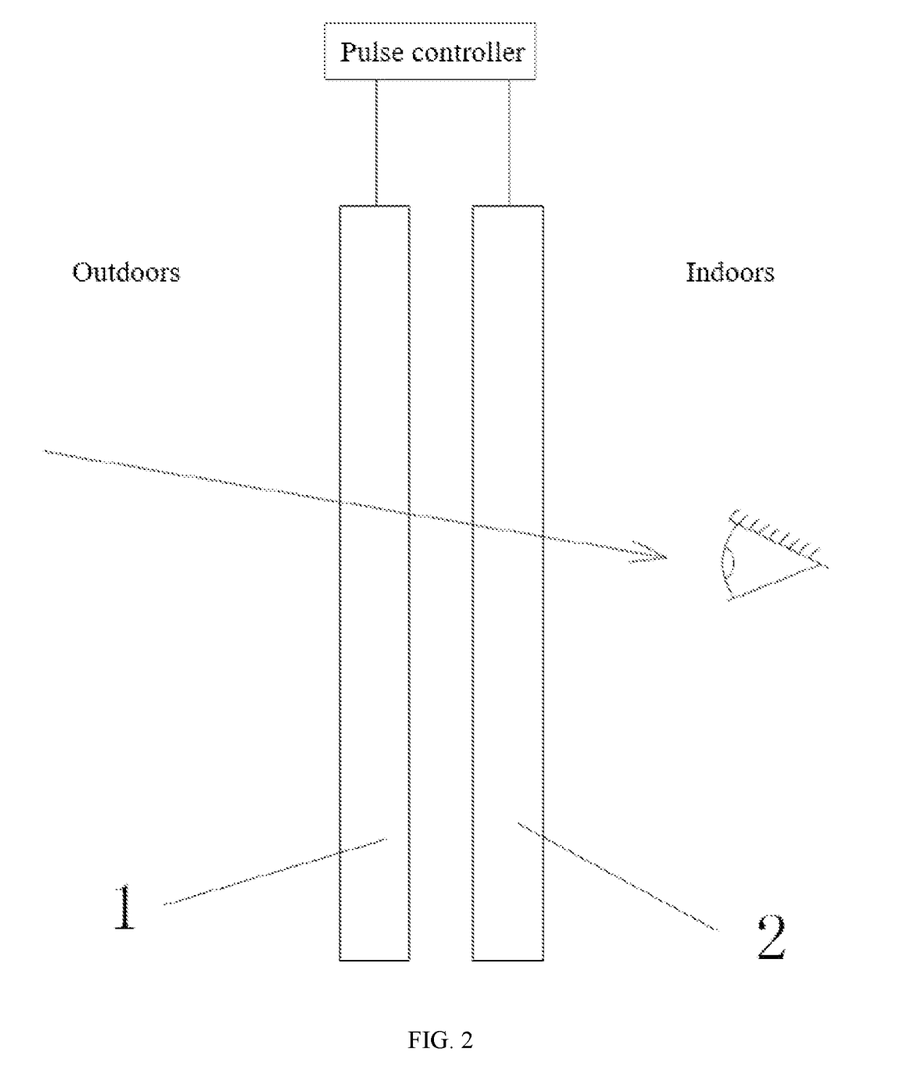
FIG. 2 is a schematic diagram of the switchable glass in a light-transmitting state according to Embodiment 1 of the present invention.
Figure 3:
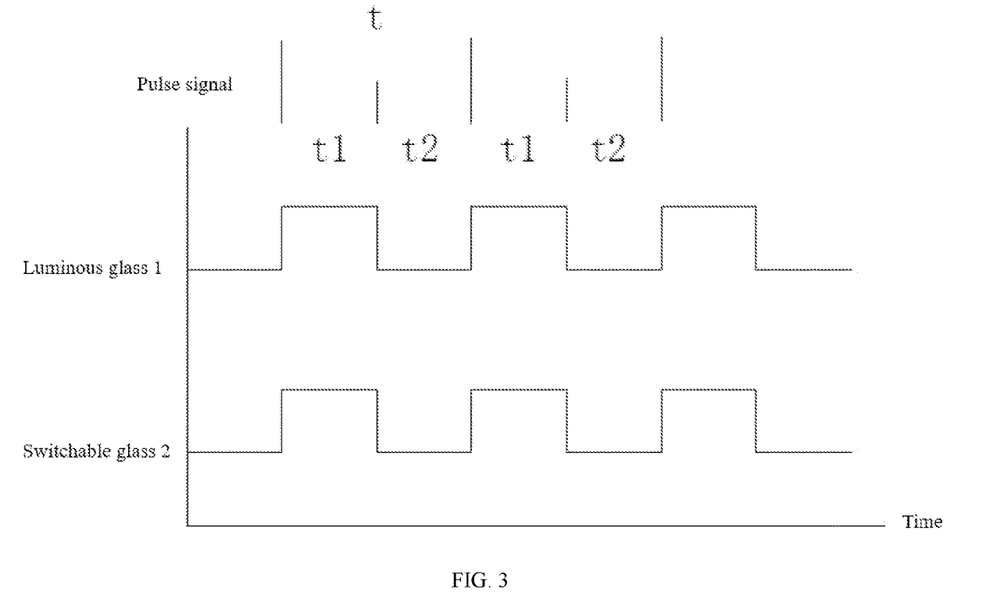
FIG. 3 is a schematic diagram of a pulse signal according to Embodiment 1 of the present invention.

Embodiment 1: As shown in FIGS. 1 and 2, a self-luminous one-way visible double glazing based on the persistence of vision of human eyes includes the switchable glass 2 with electrically controllable and adjustable light transmittance, and the self-luminous glass 1 that is electrically controlled to emit light. The self-luminous glass is an OLED self-luminous transparent screen. The switchable glass faces indoors, and the self-luminous glass faces outdoors. The switchable glass and the self-luminous glass are controlled by pulse signals of a pulse controller, as shown in FIG. 3. The pulse controller is connected to a power source. The pulse controller has two states of 0 and 1, wherein 1 indicates a power-on signal, and 0 indicates a power-off signal. The pulse controller synchronously controls electrical signals of the switchable glass and the luminous glass. The switchable glass does not transmit light when powered on, and transmits light when powered off. The luminous glass emits light when powered on, and does not emit light when powered off. The pulse signals of the pulse controller have a frequency of 50 Hz, and the duty cycle of the non-light-transmitting duration t1 of the switchable glass in each pulse signal period t is 0.5.

As shown in FIGS. 1 and 2, due to the effect of persistence of vision, when the luminous glass emits light, the eyes of outdoor people receive the light from the luminous glass. When the luminous glass stops emitting light for a period of time, due to the persistence of vision, the outdoor people still perceive that the luminous glass is emitting light, and are insensitive to light that is emitted or reflected from an indoor object and has lower brightness than the light from the luminous glass, so that the outdoor people cannot observe the indoor view. Therefore, when the electrical signal frequency of the pulse controller reaches the threshold of the persistence of vision of human eyes, a continuous luminous signal is formed in the eyes of the outdoor people, so that the outdoor people cannot see the indoor view. Moreover, when the luminous glass emits light, the switchable glass does not transmit light, so that indoor people cannot see the light from the luminous glass; and conversely, when the switchable glass transmits light, the luminous glass does not emit light, so that the outdoor view can be observed normally, thereby achieving one-way visibility from the indoors to the outdoors. In addition, even if an indoor light is turned on with a brightness higher than the brightness of the luminous glass, since other objects in the indoors are illuminated by diffuse reflectors and the reflected brightness does not exceed the brightness of the luminous glass, so that the outdoor people can only see the indoor light but cannot observe other objects in the indoors. Further, an indoor light source may be provided on a side of the switchable glass, and the indoor light source is controlled by pulse signals of the pulse controller. The indoor light source and the luminous glass are controlled to emit light synchronously by the same pulse signal. The one-way glass can achieve one-way visibility from the indoors to the outdoors regardless of day or night without being affected by indoor and outdoor illumination conditions. Even if a room is equipped with multiple windows to form multiple light sources for lighting, one-way visibility can still be achieved in the direction of setting the one-way glass.

Figure 4:
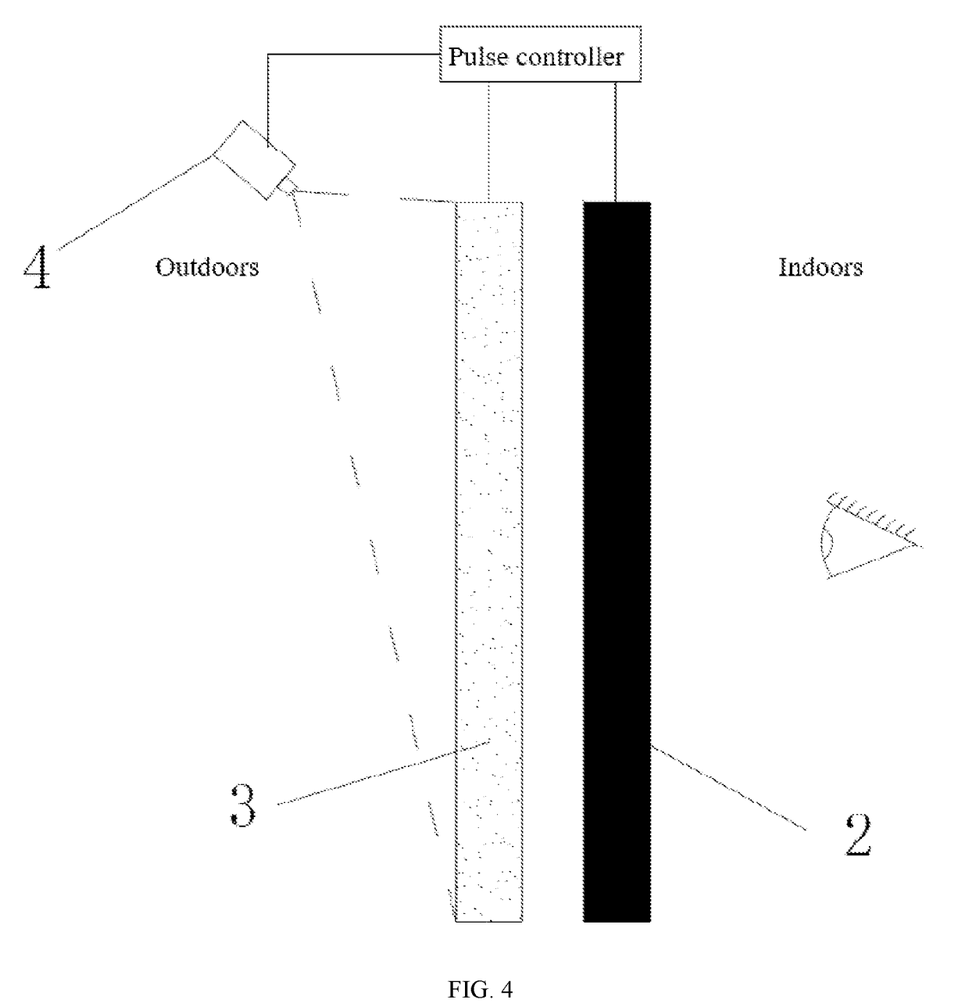
FIG. 4 is a schematic diagram of a switchable glass in a non-light-transmitting state according to Embodiment 2 of the present invention.
Figure 5:
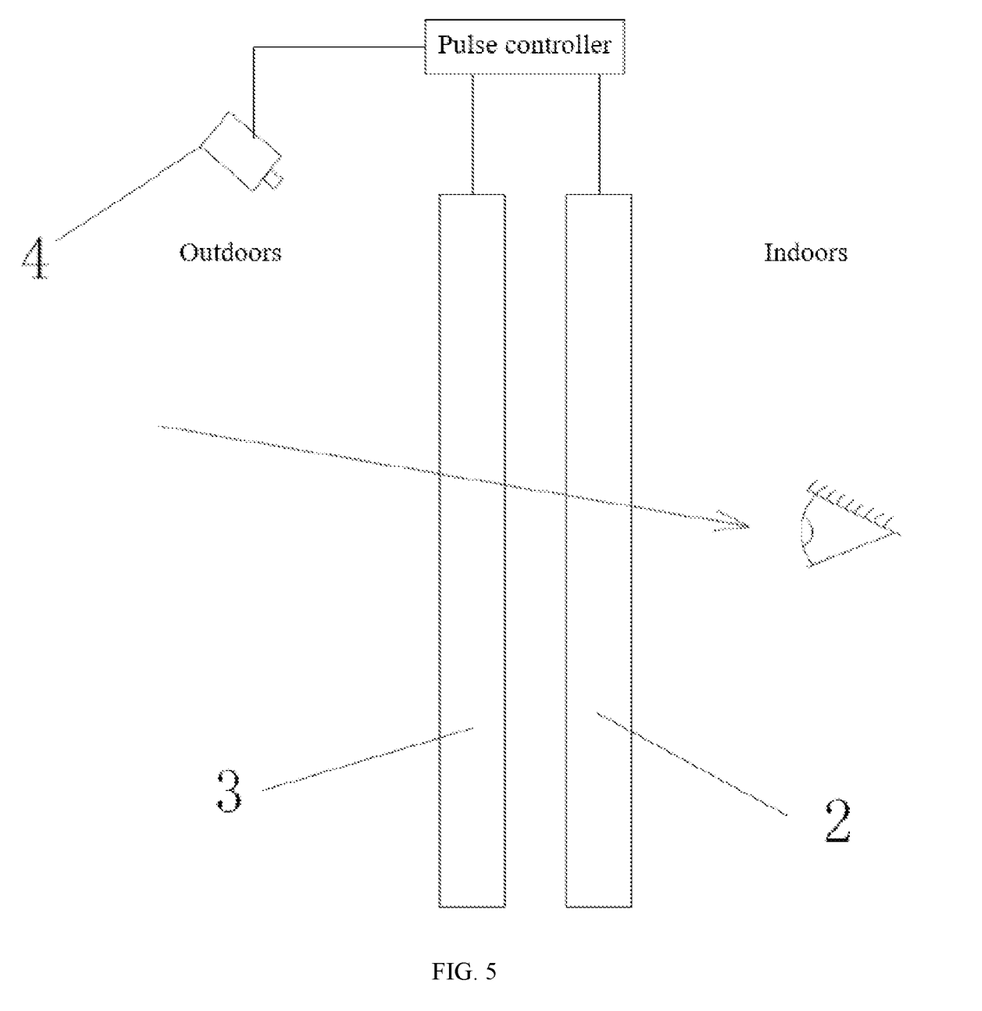
FIG. 5 is a schematic diagram of the switchable glass in a light-transmitting state according to Embodiment 2 of the present invention.
Figure 6:
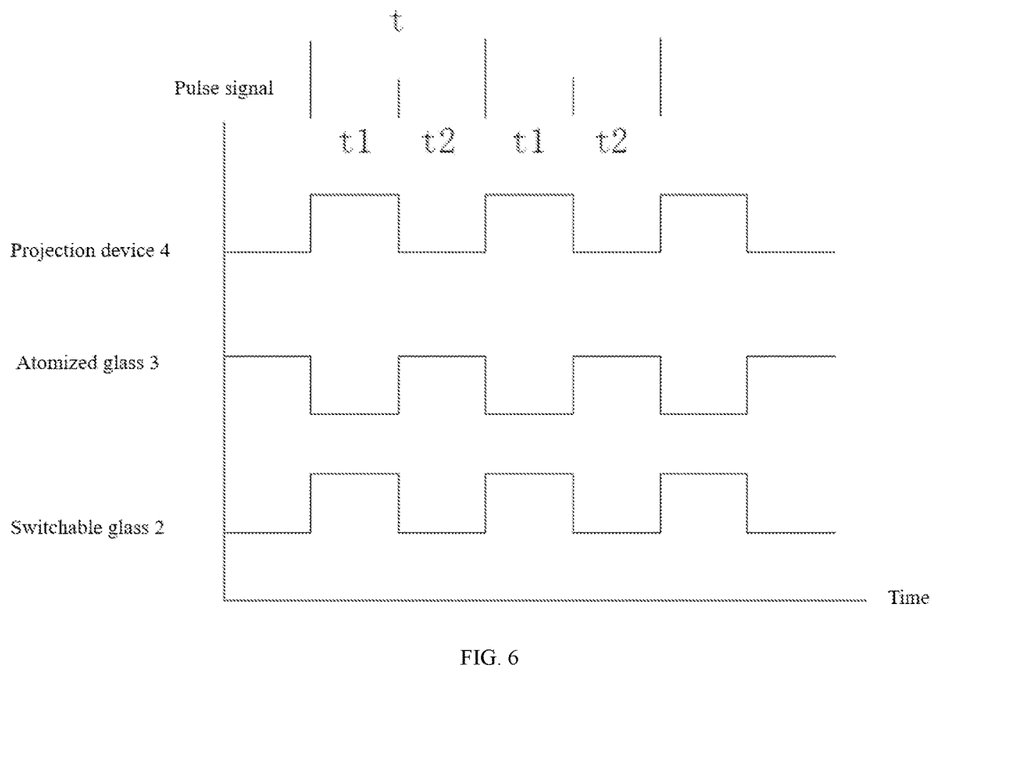
FIG. 6 is a schematic diagram of a pulse signal according to Embodiment 2 of the present invention.

Embodiment 2: As shown in FIGS. 4, 5 and 6, a projection-type one-way visible double glazing based on the persistence of vision of human eyes includes the switchable glass 2 with electrically controllable and adjustable light transmittance, and the atomized glass 3 with electrically controllable and adjustable transparency. The switchable glass faces indoors and the atomized glass faces outdoors. The outer side of the atomized glass is provided with the projection device 4. The atomized glass 3 and the projection device 4 constitute a passive projection luminous structure to achieve the effect of the luminous glass. The switchable glass, the atomized glass, and the projection device are controlled by pulse signals of a pulse controller, as shown in FIG. 6. The pulse controller is connected to a power source. The pulse controller has two states of 0 and 1, wherein 1 indicates a power-on signal, and 0 indicates a power-off signal. As shown in FIG. 6, the pulse controller synchronously controls electrical signals of the switchable glass and the projection device, and asynchronously controls electrical signals of the atomized glass. The switchable glass does not transmit light when powered on, and transmits light when powered off. The atomized glass is transparent when powered on, and is opaque when powered off. The projection device projects when powered on, and stops projection when powered off. When powered on, the switchable glass does not transmit light, the atomized glass is atomized to be opaque, and the projection device is started to project onto the atomized glass. When powered off, the switchable glass transmits light, the atomized glass is transparent, and the projection device is turned off to stop the projection. The pulse signals of the pulse controller have a frequency of 50 Hz, and the duty cycle of the non-light-transmitting duration t1 of the switchable glass in each pulse signal period t is 0.5.

As shown in FIGS. 4 and 5, due to the effect of persistence of vision, the atomized glass, when atomized, is equivalent to a frosted glass and can be used as a screen of the projection device. The projection device projects to the atomized glass, and the eyes of outdoor people receive high-brightness projected images. When the projection is stopped for a period of time, the outdoor people still have the persistence of the projected images due to the persistence of vision, and are insensitive to light that is emitted or reflected from an indoor object and has lower brightness than the light from the luminous glass, so that the outdoor people cannot observe the indoor view. Therefore, when the electrical signal frequency of the pulse controller reaches the threshold of the persistence of vision of human eyes, a continuous projection signal is formed in the eyes of the outdoor people, so that the outdoor people cannot see the indoor view. Moreover, when the atomized glass is atomized and projected, the switchable glass does not transmit light, so that indoor people cannot see the projected images. When the switchable glass transmits light, the atomized glass is transparent, and the projection is stopped, so that the outdoor view can be observed normally from the indoors, thereby achieving one-way visibility from the indoors to the outdoors. In addition, even if an indoor light is turned on with a brightness higher than the brightness of the projection, since other objects in the indoors are illuminated by diffuse reflectors and the reflected brightness does not exceed the brightness of the projection, the outdoor people can only see the indoor light but cannot observe other objects in the indoors. The one-way glass can achieve one-way visibility from the indoors to the outdoors regardless of day or night without being affected by indoor and outdoor illumination conditions. Even if a room is equipped with multiple windows to form multiple light sources for lighting, one-way visibility can still be achieved in the direction of setting the one-way glass. The one-way glass not only serves as a one-way visible privacy glass, but also can be used as an advertising projection screen facing outdoors.

Figure 7:
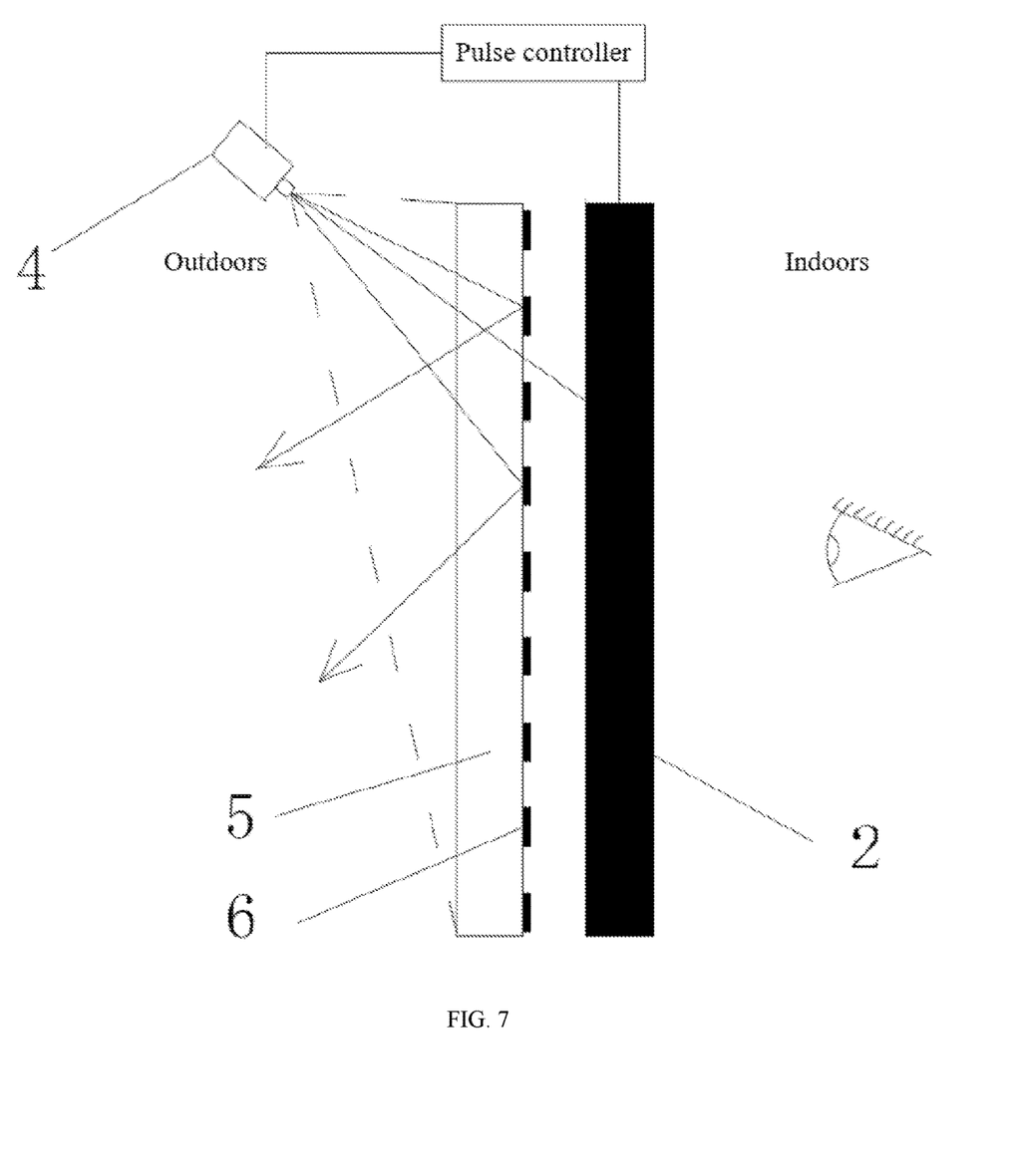
FIG. 7 is a schematic diagram of a switchable glass in a non-light-transmitting state according to Embodiment 3 of the present invention.
Figure 8:
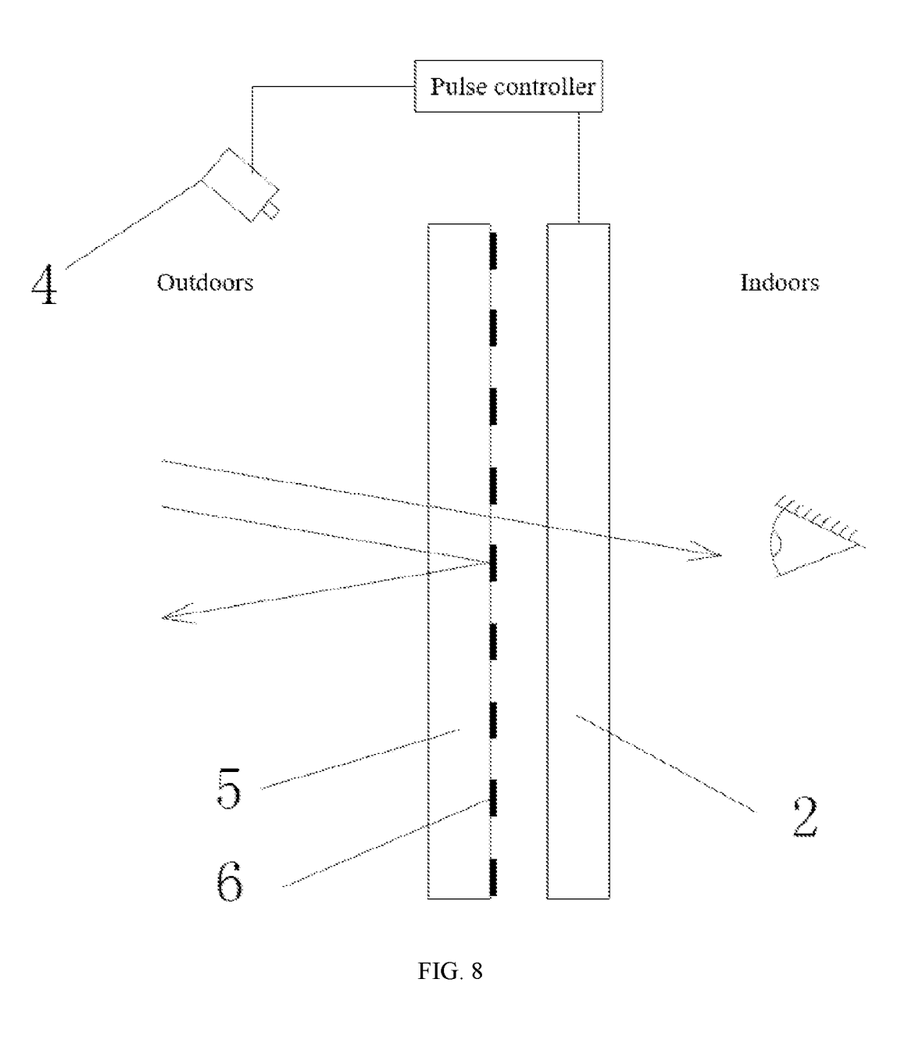
FIG. 8 is a schematic diagram of the switchable glass in a light-transmitting state according to Embodiment 3 of the present invention.
Figure 9:
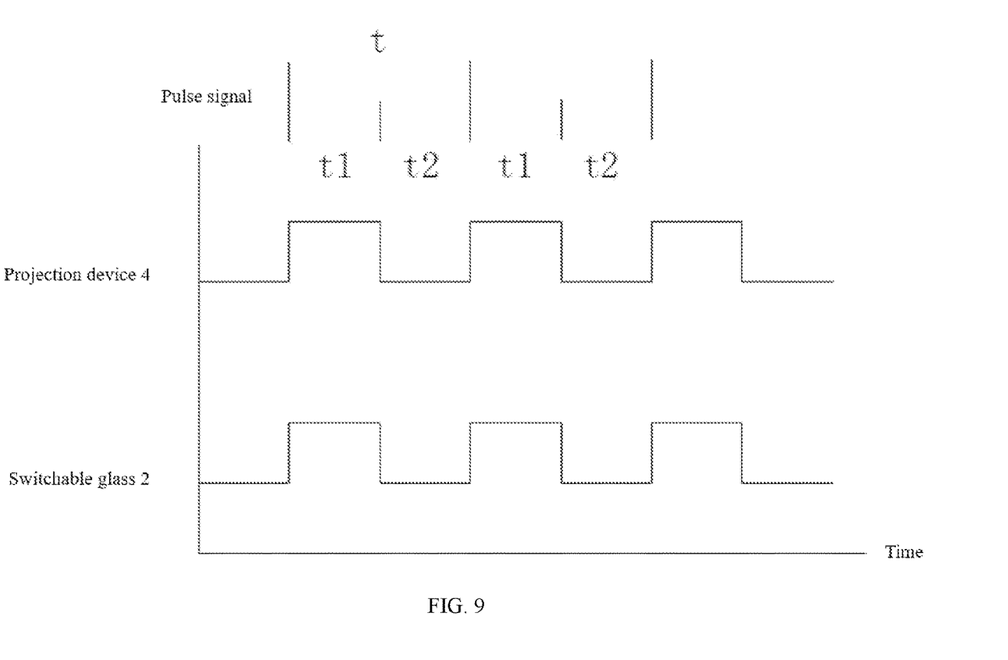
FIG. 9 is a schematic diagram of a pulse signal according to Embodiment 3 of the present invention.

Embodiment 3: As shown in FIGS. 7, 8 and 9, a projection-reflection-type one-way visible double glazing based on the persistence of vision of human eyes includes the switchable glass 2 with electrically controllable and adjustable light transmittance, and the reflective glass 5 with a surface provided with dot-matrix reflective sheets 6. A transparent gap is formed between adjacent reflective sheets. The dot-matrix reflective sheets 6 account for 30% of the area of the surface of the reflective glass. The switchable glass 2 faces indoors, and the reflective glass 5 faces outdoors. The outer side of the reflective glass is provided with the projection device 4 facing the reflective glass. The projection device and the reflective glass are controlled by pulse signals of a pulse controller, as shown in FIG. 9. The pulse controller is connected to a power source. The pulse controller has two states of 0 and 1, wherein 1 indicates a power-on signal, and 0 indicates a power-off signal. The pulse controller synchronously controls electrical signals of the switchable glass and the projection device. The switchable glass does not transmit light when powered on, and transmits light when powered off. The projection device projects when powered on, and stops projection when powered off. When powered on, the switchable glass does not transmit light, and the projection device is started to project onto the atomized glass. When powered off, the switchable glass transmits light, and the projection device is turned off to stop the projection. The pulse signals of the pulse controller have a frequency of 50 Hz, and the duty cycle of the non-light-transmitting duration t1 of the switchable glass in each pulse signal period t is 0.5.

Compared with the one-way glass of Embodiment 2, the one-way glass in the present embodiment can also be used as an advertising screen. Moreover, the reflective glass with the dot-matrix reflective sheets reduces the amount of light transmitted in the light-transmitting state, but reduces the number of control modules of the reflective glass, thereby reducing the costs of control and energy consumption. Moreover, the cost of the reflective glass is lower.

Figure 10:
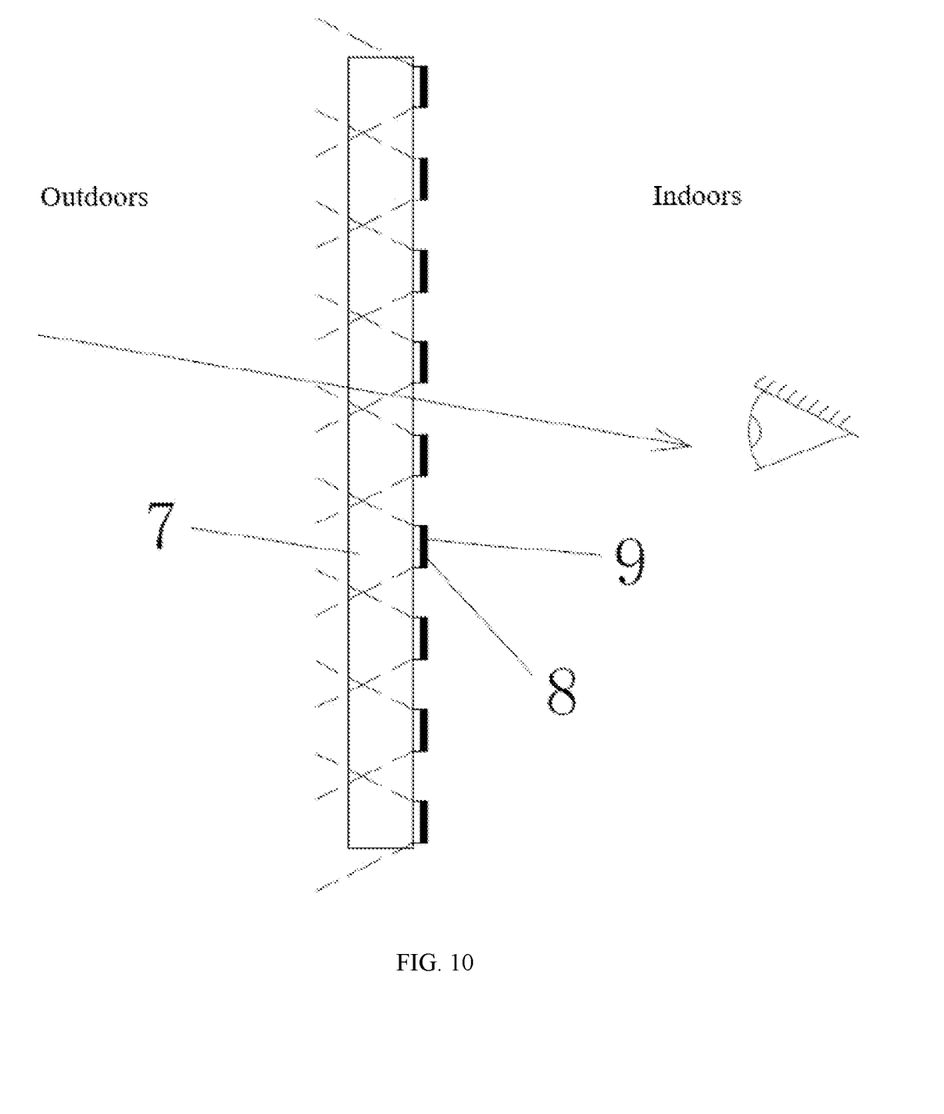
FIG. 10 is a schematic structural diagram according to Embodiment 4 of the present invention.

Embodiment 4: As shown in FIG. 10, a one-way visible single glazing based on the persistence of vision of human eyes includes the single glazing 7, and dot-matrix LED light sources 8 are uniformly provided on the single glazing. A side of the dot-matrix LED light source 8 facing indoors is provided with the black light-shielding coating 9. The light-shielding coatings and the dot-matrix LED light sources 8 are correspondingly disposed in a dot matrix. A transparent gap is formed between adjacent dot-matrix LED light sources 8. The dot-matrix LED light sources 8 account for 30% of the area of the surface of the single glazing.

The dot-matrix LED light sources 8 emit light to the outside in one direction. When the indoor brightness is lower than that of the dot-matrix LED light sources 8, the indoors are invisible to the outdoor people due to the effect of persistence of vision of the dot-matrix LED light sources, but the indoor people can see outdoor objects without being affected by the dot-matrix light sources. The one-way glass does not need pulse adjustment, and thus has lower costs.

Figure 11:
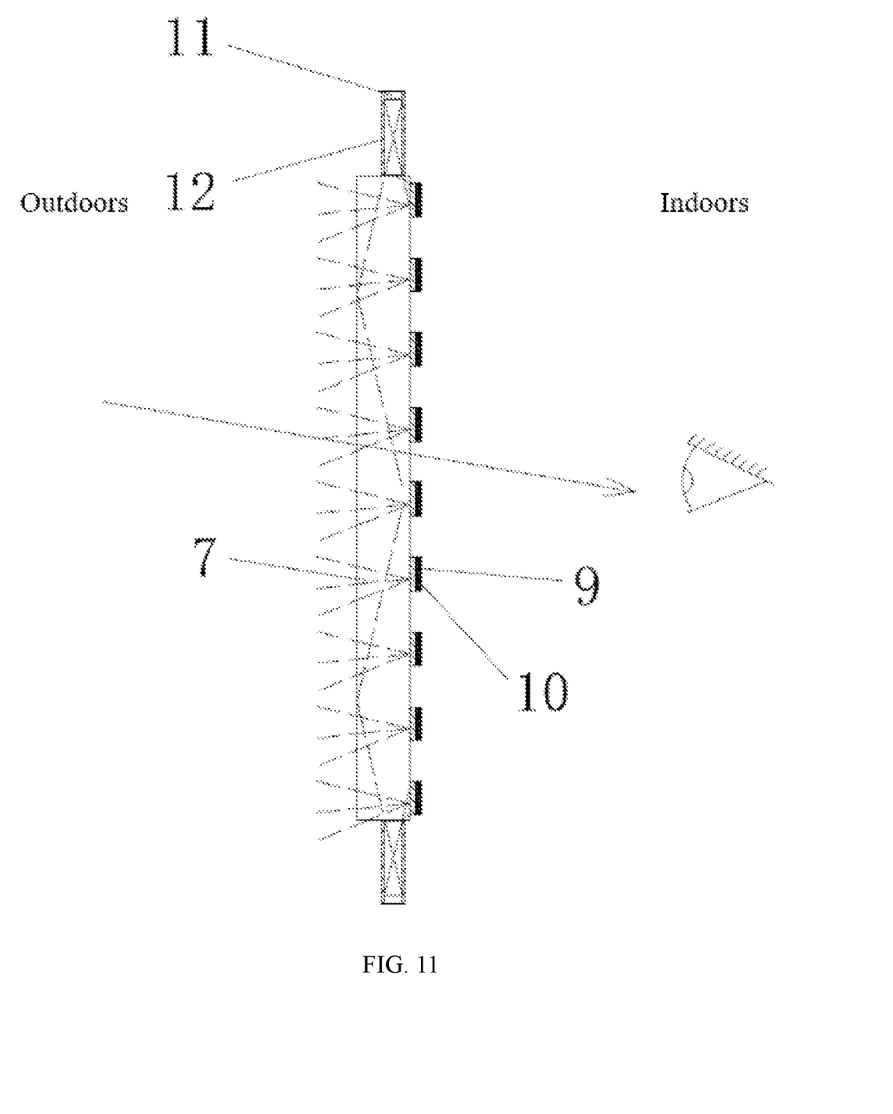
FIG. 11 is a schematic structural diagram according to Embodiment 5 of the present invention.

Embodiment 5: As shown in FIG. 11, a one-way visible single glazing based on the persistence of vision of human eyes includes the single glazing 7, and dot-matrix reflective sheets 10 for passive projection and light emission are uniformly attached to the inner surface of the single glazing. A side of the dot-matrix reflective sheet 10 facing indoors is provided with the black light-shielding coatings 9. The light-shielding coatings and the dot-matrix reflective sheets 10 are correspondingly disposed in a dot matrix. A transparent gap is formed between adjacent dot-matrix reflective sheets 10. The dot-matrix reflective sheets 10 account for 30% of the area of the surface of the single glazing. The side light source 11 is provided on a side of the single glazing 7 in a circumferential direction. The side light source irradiates the single glazing 7 from the circumferential direction. The light from the side light source is totally reflected on the inner and outer surfaces of the single glazing, and the light from the side light source is diffusely reflected at the dot-matrix reflective sheets. The light pipe 12 is provided between the side light source 11 and a circumferential side wall of the single glazing. The inner wall of the light pipe is provided with a light-shielding coating.

The side light source adjusts the direction of the light to form light incident from the circumferential side of the single glazing and totally reflected on the front and rear sides of the single glazing. When irradiating the reflective sheets, the totally reflected light is diffusely reflected to emit light irradiating outwards. The present embodiment has lower costs.

Figure 12:
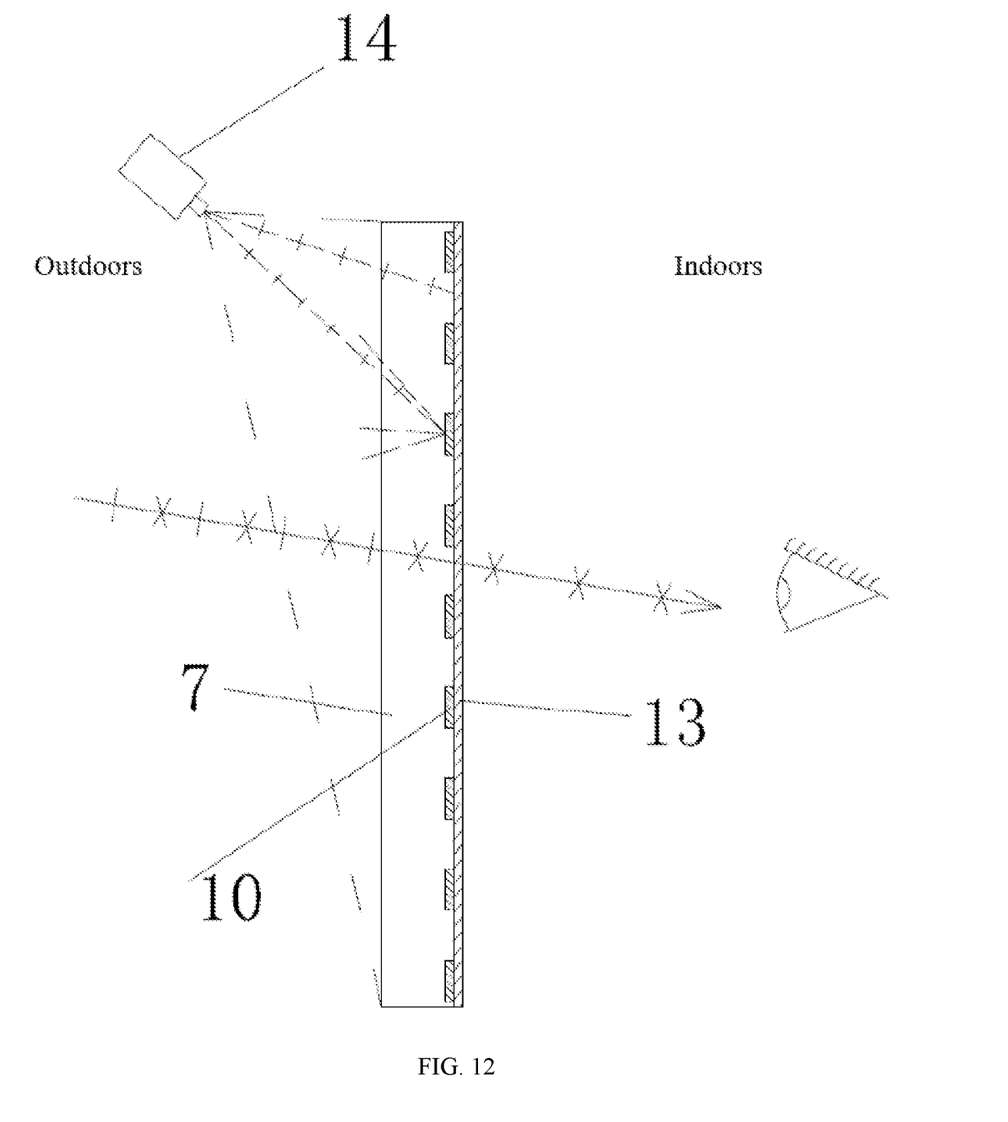
FIG. 12 is a schematic structural diagram according to Embodiment 6 of the present invention.

Embodiment 6: As shown in FIG. 12, a one-way visible single glazing based on the persistence of vision of human eyes includes the single glazing 7, and dot-matrix reflective sheets 10 for passive projection and light emission are uniformly attached to the inner surface of the single glazing. A side of the dot-matrix reflective sheet 10 facing indoors is provided with the polarizing film 13 that entirely covers the single glazing. The outer side of the single glazing is provided with the polarized light projection device 14 facing the single glazing. The polarized light projection device projects polarized light in a single polarization direction that can be absorbed by the polarizing film onto the single glazing.

The polarized light projection device projects the polarized light in a single polarization direction. The polarized light is diffusely reflected at the reflective sheets, and is completely absorbed when irradiated on the surface of the polarizing film at the gaps of the reflective sheets, so that the indoor people can see the light from the projection device. Moreover, for natural light, the polarization direction is balanced in all directions. After being half absorbed by the polarizing film, outdoor light is visible to the indoor people. After indoor light is half absorbed by the polarizing film, the brightness of the indoor light is much smaller than the brightness of the light diffusely reflected at the reflective sheets from the polarized light projection device. Due to the effect of persistence of vision, the projection at the reflective sheets is visible to the human eyes, and the sensitivity to the indoor light is shielded so that the indoor light is invisible. In the present embodiment, the polarized light projection device can be always turned on without pulse control, and the projection brightness can be significantly improved.

What is claimed is:

1. A one-way glass based on a persistence of vision of human eyes, comprising a double glazing;
wherein
the double glazing comprises a switchable glass and a luminous glass;
the switchable glass has an electrically controllable and adjustable light transmittance, and the luminous glass is electronically controlled to emit a first light;
the luminous glass is a transparent glass;

the switchable glass and the luminous glass are controlled by pulse signals of a pulse controller;
when the luminous glass emits the first light, the switchable glass does not transmit the first light; and
when the switchable glass transmits the first light, the luminous glass does not emit the first light.

2. The one-way glass based on the persistence of the vision of the human eyes according to claim 1, wherein
the pulse controller is connected to a power source, and the pulse controller has two states of 0 and 1, wherein 1 indicates a power-on signal, and 0 indicates a power-off signal.

3. The one-way glass based on the persistence of the vision of the human eyes according to claim 2, wherein
the luminous glass is a self-luminous structure, and
the luminous glass is an organic light-emitting diode (OLED) self-luminous transparent screen or the luminous glass is the transparent glass with dot-matrix light-emitting diode (LED) light sources.

4. The one-way glass based on the persistence of the vision of the human eyes according to claim 2, wherein
the luminous glass is a passive projection luminous structure, and the luminous glass is an atomized glass with an electrically controllable and adjustable transparency;
an outer side of the atomized glass is provided with a projection device facing the atomized glass;
the switchable glass, the atomized glass, and the projection device are controlled by the pulse signals of the pulse controller;
when the atomized glass is atomized to be opaque and the projection device is started to project onto the atomized glass, the switchable glass does not transmit the first light; and
when the switchable glass transmits the first light, the atomized glass is transparent, and the projection device is turned off to stop projection.

5. The one-way glass based on the persistence of the vision of the human eyes according to claim 2, wherein
the luminous glass is a passive projection luminous structure;
the luminous glass is a reflective glass with a surface provided with dot-matrix reflective sheets, and a transparent gap is formed between adjacent dot-matrix reflective sheets of the dot-matrix reflective sheets;
an outer side of the reflective glass is provided with a projection device facing the reflective glass;
the projection device and the luminous glass are controlled by the pulse signals of the pulse controller;
when the projection device is turned on, the switchable glass does not transmit the first light; and
when the switchable glass transmits the first light, the projection device is turned off.

6. The one-way glass based on the persistence of the vision of the human eyes according to claim 5, wherein
the dot-matrix reflective sheets account for 5-50% of an area of a surface of the luminous glass.

7. The one-way glass based on the persistence of the vision of the human eyes according to claim 2, wherein
the pulse signals of the pulse controller have a frequency of at least 24 Hz, and a duty cycle of a light-emitting duration of the luminous glass in each pulse signal period is not less than 0.1.

8. The one-way glass based on the persistence of the vision of the human eyes according to claim 2, wherein
a side of the switchable glass is provided with an indoor light source;
the indoor light source is controlled by the pulse signals of the pulse controller;
when the indoor light source emits a second light, the switchable glass does not transmit the second light; and
when the switchable glass transmits the second light, the indoor light source does not emit the second light.

9. The one-way glass based on the persistence of the vision of the human eyes according to claim 1, wherein
the luminous glass is a self-luminous structure, and
the luminous glass is an organic light-emitting diode (OLED) self-luminous transparent screen or the luminous glass is the transparent glass with dot-matrix light-emitting diode (LED) light sources.

10. The one-way glass based on the persistence of the vision of the human eyes according to claim 1, wherein
the luminous glass is a passive projection luminous structure, and the luminous glass is an atomized glass with an electrically controllable and adjustable transparency;
an outer side of the atomized glass is provided with a projection device facing the atomized glass;
the switchable glass, the atomized glass, and the projection device are controlled by the pulse signals of the pulse controller;
when the atomized glass is atomized to be opaque and the projection device is started to project onto the atomized glass, the switchable glass does not transmit the first light; and
when the switchable glass transmits the first light, the atomized glass is transparent, and the projection device is turned off to stop projection.

11. The one-way glass based on the persistence of the vision of the human eyes according to claim 1, wherein
the luminous glass is a passive projection luminous structure;
the luminous glass is a reflective glass with a surface provided with dot-matrix reflective sheets, and a transparent gap is formed between adjacent dot-matrix reflective sheets of the dot-matrix reflective sheets;
an outer side of the reflective glass is provided with a projection device facing the reflective glass;
the projection device and the luminous glass are controlled by the pulse signals of the pulse controller;
when the projection device is turned on, the switchable glass does not transmit the first light; and
when the switchable glass transmits the first light, the projection device is turned off.

12. The one-way glass based on the persistence of the vision of the human eyes according to claim 11, wherein
the dot-matrix reflective sheets account for 5-50% of an area of a surface of the luminous glass.

13. The one-way glass based on the persistence of the vision of the human eyes according to claim 1, wherein
the pulse signals of the pulse controller have a frequency of at least 24 Hz, and a duty cycle of a light-emitting duration of the luminous glass in each pulse signal period is not less than 0.1.

14. The one-way glass based on the persistence of the vision of the human eyes according to claim 1, wherein
a side of the switchable glass is provided with an indoor light source;
the indoor light source is controlled by the pulse signals of the pulse controller;
when the indoor light source emits a second light, the switchable glass does not transmit the second light; and
when the switchable glass transmits the second light, the indoor light source does not emit the second light.

15. A one-way glass based on a persistence of vision of human eyes, comprising
a single glazing;
wherein
dot-matrix luminous bodies are uniformly provided on the single glazing,
a side of the dot-matrix luminous bodies facing indoors is provided with a light-shielding layer, and
a transparent gap is formed between adjacent dot-matrix light sources.

16. The one-way glass based on the persistence of the vision of the human eyes according to claim 15, wherein
the dot-matrix luminous bodies are self-luminous dot-matrix LED light sources,
the light-shielding layer is black light-shielding coatings applied on a side of the self-luminous dot-matrix LED light sources facing the indoors, and
the black light-shielding coatings and the self-luminous dot-matrix LED light sources are correspondingly distributed in a dot matrix.

17. The one-way glass based on the persistence of the vision of the human eyes according to claim 15, wherein
the dot-matrix luminous bodies are dot-matrix reflective sheets attached to an inner surface of the single glazing, wherein the dot-matrix reflective sheets are configured for a passive projection and a light emission;
the light-shielding layer is black light-shielding coatings applied on a side of the dot-matrix reflective sheets facing the indoors;
the black light-shielding coatings and the dot-matrix reflective sheets are correspondingly distributed in a dot matrix;
a side light source is provided on a side of the single glazing in a circumferential direction;
the side light source irradiates the single glazing from the circumferential direction;
a light from the side light source is totally reflected on an inner surface and an outer surface of the single glazing; and
the light from the side light source is diffusely reflected at the dot-matrix reflective sheets.

18. The one-way glass based on the persistence of the vision of the human eyes according to claim 17, wherein
a light pipe is provided between the side light source and a circumferential side wall of the single glazing, and
an inner wall of the light pipe is provided with a light-shielding coating.

19. The one-way glass based on the persistence of the vision of the human eyes according to claim 17, wherein
a lens for converging a direction of the light is provided between the side light source and a circumferential side wall of the single glazing.

20. The one-way glass based on the persistence of the vision of the human eyes according to claim 15, wherein
the dot-matrix luminous bodies are dot-matrix reflective sheets for a passive projection and a light emission;
the light-shielding layer is a polarizing film, and the polarizing film entirely covers the single glazing on a side of the dot-matrix reflective sheets facing the indoors;
an outer side of the single glazing is provided with a polarized light projection device facing the single glazing; and
the polarized light projection device projects a polarized light in one polarization direction onto the single glazing, wherein the polarized light is absorbed by the polarizing film.

* * * * *